United States Patent [19]

Watanabe

[11] 4,328,052
[45] May 4, 1982

[54] RETAINER ASSEMBLY FOR MOLDING STRIPS AND METHOD OF SECURING MOLDING STRIPS IN PLACE

[75] Inventor: Yutaka Watanabe, Toyoake, Japan

[73] Assignee: Aisin Seiki Kabushiki Kaisha, Kariya, Japan

[21] Appl. No.: 96,398

[22] Filed: Nov. 21, 1979

[30] Foreign Application Priority Data

Nov. 28, 1978 [JP] Japan .......................... 53/164016[U]

[51] Int. Cl.³ .............................................. B32B 7/04
[52] U.S. Cl. ...................................... 156/91; 293/126; 293/128; 156/313; 52/716; 52/717; 52/718; 428/41; 428/31; 428/223; 428/343
[58] Field of Search ................... 428/31, 223, 343, 41; 293/126, 128; 156/DIG. 4, DIG. 5, 91, 313; 52/716-718

[56] References Cited

U.S. PATENT DOCUMENTS

| | | | |
|---|---|---|---|
| 2,256,921 | 9/1941 | Bishop | 428/11 |
| 3,572,799 | 3/1971 | Truesdall | 428/167 |
| 3,916,046 | 10/1975 | Youngberg | 428/31 |

Primary Examiner—George F. Lesmes
Assistant Examiner—E. Rollins Buffalow

[57] ABSTRACT

A retainer assembly for and method of securing a molding strip to an exterior automobile panel which includes a body engaged with the molding strip and having a surface which confronts the automobile panel. A double surface adhesive sheet is on part of the body surface and a liquid bonding agent on another part. The adhesive sheet holds the molding strip on the automobile panel while the liquid bonding agent solidifies. Thereafter, both the adhesive sheet and the bonding agent hold the molding strip in place.

7 Claims, 6 Drawing Figures

RETAINER ASSEMBLY FOR MOLDING STRIPS AND METHOD OF SECURING MOLDING STRIPS IN PLACE

BACKGROUND OF THE INVENTION

1. Field of the Invention

The present invention relates to retainers, and more particulary to an improved retainer assembly for holding elongated molding strips in place on the outer surface of automobile doors and body side panels, and to an improved method of securing molding strips to automobile doors and side panels.

2. Description of the Prior Art

Several types of conventional retainer assemblies for automobile molding strips are disclosed in Truesdell et al U.S. Pat. No. 3,572,799 granted Mar. 30, 1971. That patent discloses one retainer assembly which includes clip members each having a projecting lug which extends through an opening in the automobile door or side panel and engages the metal behind the opening. Another retainer assembly disclosed in the Truesdell et al patent includes adhesive sheets which directly adhere the molding strip to the metal panel.

To use the clip retainer assembly, it is necessary to drill or punch holes in the metal panels. This is undesirable for the reason that corrosion of the metal around the holes often occurs.

The version which uses adhesive sheets has the problem that the molding has a small surface area engaging the adhesive surface and the weight of that molding sometimes exceeds the adhesive force of adhesive sheets.

SUMMARY OF THE INVENTION

One of the objects of the present invention is to provide a retainer assembly for elongated molding strips which overcomes the disadvantages in the above-described conventional retainer assemblies and provides a strong holding force for holding molding strips on automobile doors, side panels, and the like.

Another object of the present invention is to provide an improved retainer assembly which provides a strong adhesive force to hold the molding strip in place even if there is only a small adhesive surface on the molding strip.

Still another object of this invention is to provide an improved retainer assembly and method which facilitates rapid attachment of a molding strip to an automobile panel without requiring that holes be drilled or punched in the panel.

Still another object of this invention is to provide a retainer assembly for elongated molding strips which is low in cost and simple in construction.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the retainer assembly for securing a molding strip to an exterior metal panel of an automobile comprises a body, means on said body for engaging with said molding strip; an attachment portion formed on a surface of said body adapted to confront said exterior metal panel on said automobile; said attachment portion including a first surface portion for adhering a double surface adhesive sheet thereto and a second surface portion adjacent the first surface portion for applying a liquid bonding agent thereon; whereby said molding strip is first attached to said automobile panel by said adhesive sheet while said liquid bonding agent solidifies.

In another aspect, the invention is directed to a method of securing an elongated molding strip to an exterior metal panel of an automobile comprising the steps of providing a plurality of retainer members each having a surface adapted to confront a surface of said automobile panel at spaced locations along said molding strip; providing a double surface adhesive sheet on a first surface portion of said retainer member surface; applying a liquid bonding agent to a second surface portion of said retainer member surface adjacent the first surface portion; pressing said molding strip in place on said automobile panel by causing said adhesive sheets and said liquid bonding agent to engage said panel; and allowing said liquid bonding agent to solidify while said adhesive sheets hold said molding strip in place on said panel.

DETAILED DESCRIPTION OF THE INVENTION

Figure 1:
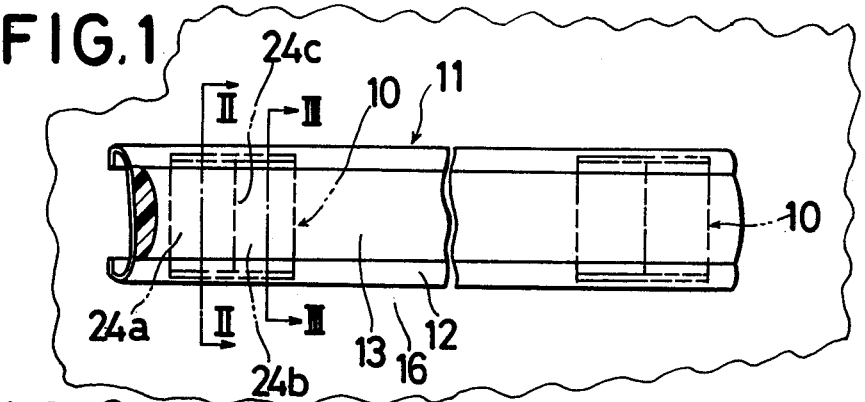
FIG. 1 is a fragmentary perspective view of an automobile door panel illustrating a preferred embodiment of retainer assembly attaching and securing an elongated molding strip thereto.
Figure 2:
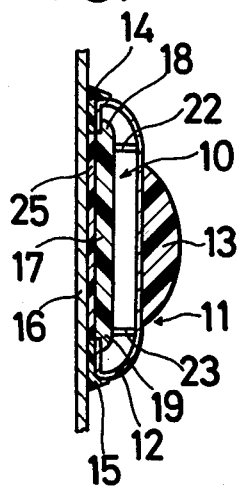
FIG. 2 is an enlarged vertical sectional view taken along the line II—II of FIG. 1.
Figure 3:
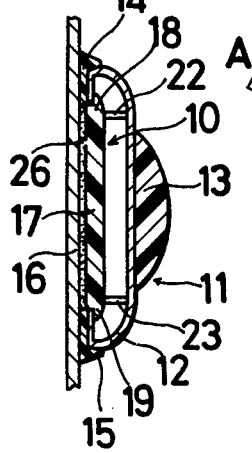
FIG. 3 is an enlarged vertical sectional view taken along the line III—III of FIG. 1.

Referring now to FIGS. 1-3, an elongated molding strip 11 is seen to include an elongated metallic strip 12 and an elongated plastic strip 13 suitably secured together. A pair of elongated plastic pads 14, 15 may be suitably secured to the metallic strip 12 along its length to prevent the metallic strip 12 from scratching the panel to which the molding strip 11 is attached.

Figure 4:
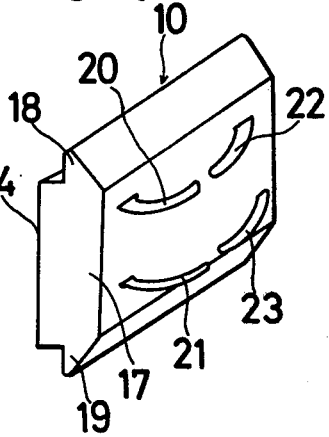
FIG. 4 is a perspective view of a retaining member employed in FIGS. 1 to 3.
Figure 5:
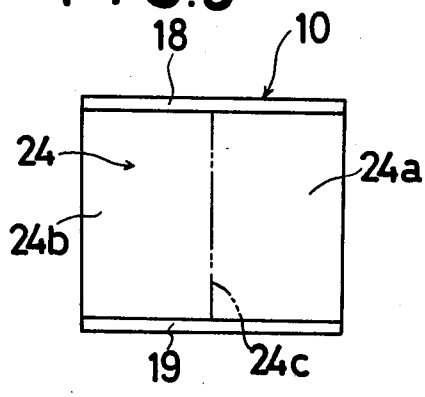
FIG. 5 is a view of FIG. 4 looking in the direction of arrow "A"

In accordance with the invention, the molding strip is attached to an exterior automobile panel, for example, a door, by retainer assemblies positioned at spaced apart locations along the strip. As embodied herein, the retainer assembly includes a plurality of spaced-apart retainer members generally indicated at 10 which are constructed for engagement with the metalic-molding strip 12. As seen in FIGS. 4 and 5, the retainer members 10 are made of suitable plastic material, and generally include a body 17 having longitudinally extending flanges 18, 19 which project laterally of the body 17, and elastic legs 20, 21, 22, 23 which project upwardly therefrom.

In accordance with the invention, the retainer member is constructed to receive a double surface adhesive sheet and a liquid bonding agent both of which engage the automobile panel. As embodied herein, the body 17 has an attachment portion 24 defining a surface which confronts the automobile panel 16 and includes a surface 24a for receiving a double surface adhesive sheet 25, and a surface 24b for applying a liquid bonding agent 26. Surfaces 24a and 24b are adjacent and distinct from each other and are separated by a straight line 24c as shown in FIGS. 1 and 5.

In accordance with the invention, a retainer member is positioned at substantially both end portions of the molding strip to hold the molding strip in place on the automobile panel. As embodied herein, and shown in FIG. 1, a retainer member 10 is engaged with the molding strip 11 adjacent each end. The flanges 18, 19 on each of the retainer member bodies 17 engage the metallic strip 12 and are held in place by a force imparted by the elastic legs 20, 21, 22, 23 which engage with the metallic strip 12 and press the flanges 18, 19 tightly against the strip 12 as seen in FIGS. 2 and 3. It will be appreciated that other retainer members 10 can be positioned intermediate the ends of molding strip 12 if desired.

The process by which molding strip 11 is attached to exterior door or side panel 16 is as follows.

(1) A retainer member 10 is attached to substantially both ends of the molding strip 11 and at other locations as desired.

(2) A double surface adhesive sheet 25 having a detachable cover (not shown) made of paper for covering one of surfaces thereof is fastened by its exposed adhesive surface to the surface 24a of attachment portion 24 of each of the retainer members 10.

(3) The detachable cover is released from each of the double surface adhesive sheets 25.

(4) A bonding agent 26, for example, a liquid urethane type or silicon type material, is applied to the surface 24b on the attachment portion 24 of each retainer member 10.

(5) The retainer member 10 are pressed in place against the exterior door or side panel 16 by pressure against the molding strip 11.

(6) Simultaneously, the retainer members 10 are adhered to exterior door or side panel 16 by the double surface adhesive sheets 25 which hold the retainer members 10 and the molding strip 11 in the proper position on the exterior door or side panel 16 after releasing the pressing action.

(7) While the double surface adhesive sheets 25 hold the retainer members 10 in place, the liquid bonding agent 26 solidifies to generate a bonding force thereby to secure the retainer member 10 to the exterior panel 16 perhaps as much as 5 or 6 hours after release of the pressing action.

As a result, the molding 11 is firmly secured to the exterior door or side panel 16 by the plurality of spaced-apart retainer members 10 without drilling or punching holes in the door or side panel and even if the molding strip is of comparatively heavy weight or has only a relatively small adhesive surface. The attachment force of each of the retainer members 10 holding the molding strip 11 to the exterior door or side panel 16 is at first the auto-adhesive force of adhesive sheets 25 and then is both the adhesive force of adhesive sheets 25 and the bonding force of bonding agent 26 in the final stage.

Figure 6:
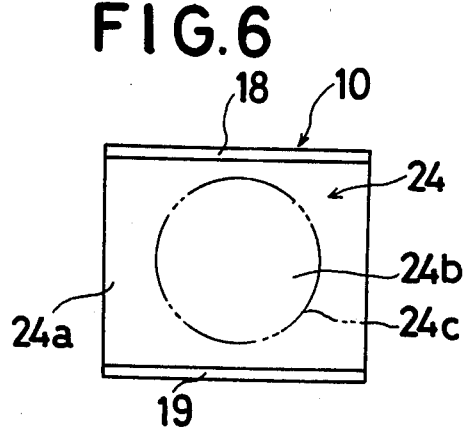
FIG. 6 is a view similar to FIG. 5 illustrating a modified embodiment of the invention.

According to a modified embodiment of the present invention as shown in FIG. 6, the attachment portion 24 of retainer members 10 comprises surfaces 24a and 24b, surface portion 24b being encircled by a circular boundary line 24c.

Obviously, many modifications and variations of the present invention are possible in light of the above teachings. It is therefore to be understood that within the scope of the appended claims the invention may be practiced otherwise than as specifically described herein.

What is claimed is:

1. A retainer assembly for securing a molding strip to an exterior metal panal of an automobile comprising:
 a body;
 means on said body for engaging with said molding strip;
 an attachment portion defining a surface of said body adapted to confront said exterior metal panel on said automobile;
 said attachment portion surface including a first surface portion for adhering a double surface adhesive sheet thereto and a second surface portion adjacent said first surface portion for applying a liquid bonding agent thereon;
 both said double surface adhesive sheet and said liquid bonding agent adapted to engage said automobile panel when said molding strip is pressed thereagainst;
 whereby said molding strip is attached to said automobile panel by said adhesive sheet and is held in position thereby while said liquid bonding agent solidifies.

2. A retainer assembly as set forth in claim 1, wherein said first and second surface portions are separated by a straight boundary line.

3. A retainer assembly as set forth in claim 1, wherein said engaging means between said body and said molding strip include means on said body elastically engaged with said molding strip.

4. A retainer assembly as set forth in claim 1, wherein said first and second surface portions are separated by a circular boundary line.

5. A retainer assembly as set forth in claim 4, wherein said second surface portion is located at a center portion of said attachment portion.

6. A retainer assembly as set forth in claim 1, wherein said molding strip is elongated and a plurality of said bodies are engaged with said molding strip at spaced locations therealong.

7. A method of securing an elongated molding strip to an exterior metal panel of an automobile comprising the steps of:
 providing a plurality of retainer members each including a body having a surface adapted to confront a surface of said automobile panel at spaced locations along said molding strip;
 providing a double surface adhesive sheet on a first surface portion of said body surface;
 applying a liquid bonding agent to a second surface portion of said body surface adjacent said first surface portion;
 pressing said molding strip in place on said automobile panel by causing said adhesive sheets and said liquid bonding agent to engage said panel;
 and allowing said liquid bonding agent to solidify while said adhesive sheets hold said molding strip in place on said panel.

* * * * *